April 18, 1950     C. L. JOHNSON ET AL     2,504,422
AIRCRAFT ENGINE AND FUSELAGE ARRANGEMENT
Original Filed April 25, 1946     3 Sheets-Sheet 1
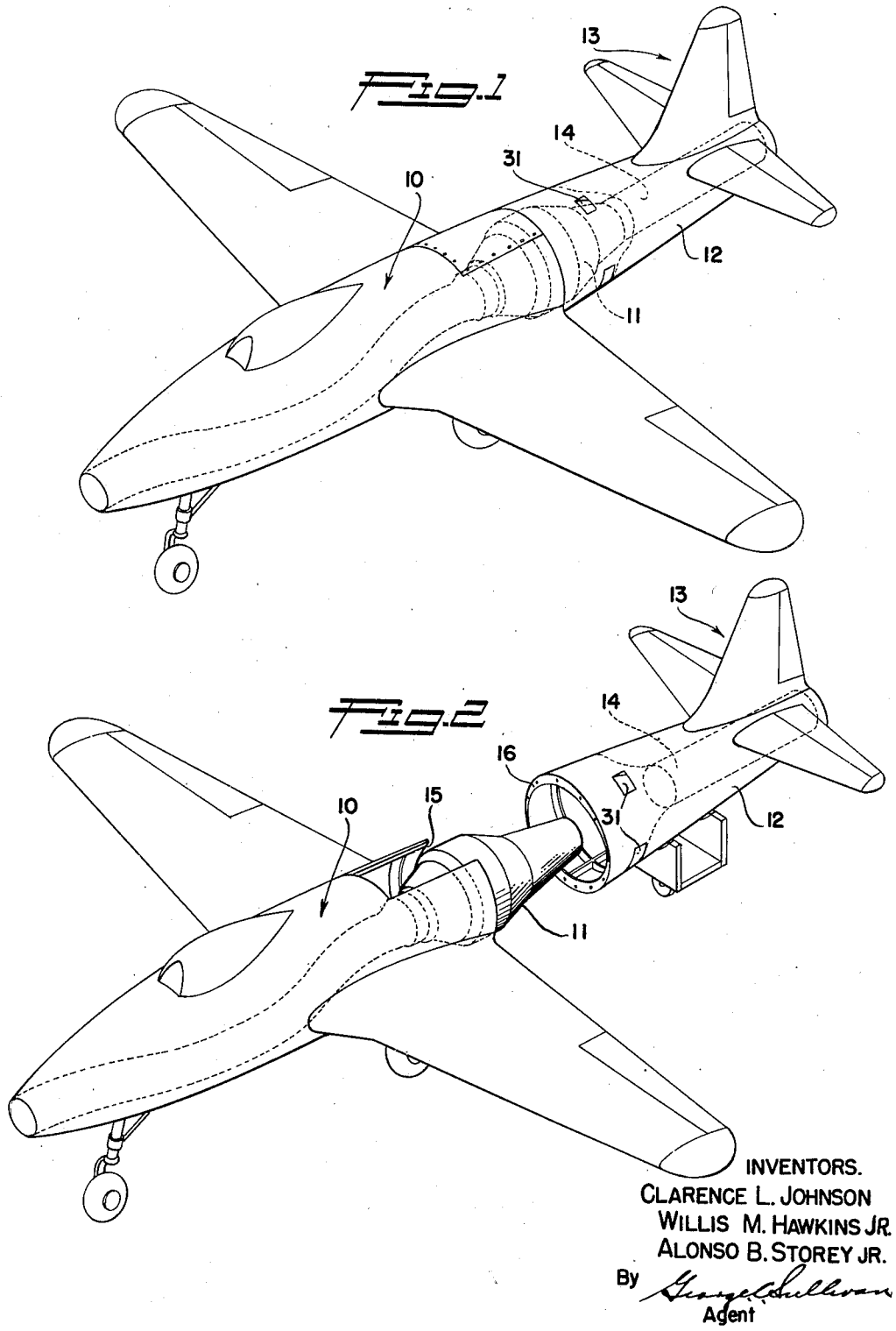
INVENTORS.
CLARENCE L. JOHNSON
WILLIS M. HAWKINS JR.
ALONSO B. STOREY JR.
By George Sullivan
Agent April 18, 1950 C. L. JOHNSON ET AL 2,504,422
AIRCRAFT ENGINE AND FUSELAGE ARRANGEMENT
Original Filed April 25, 1946 3 Sheets-Sheet 2
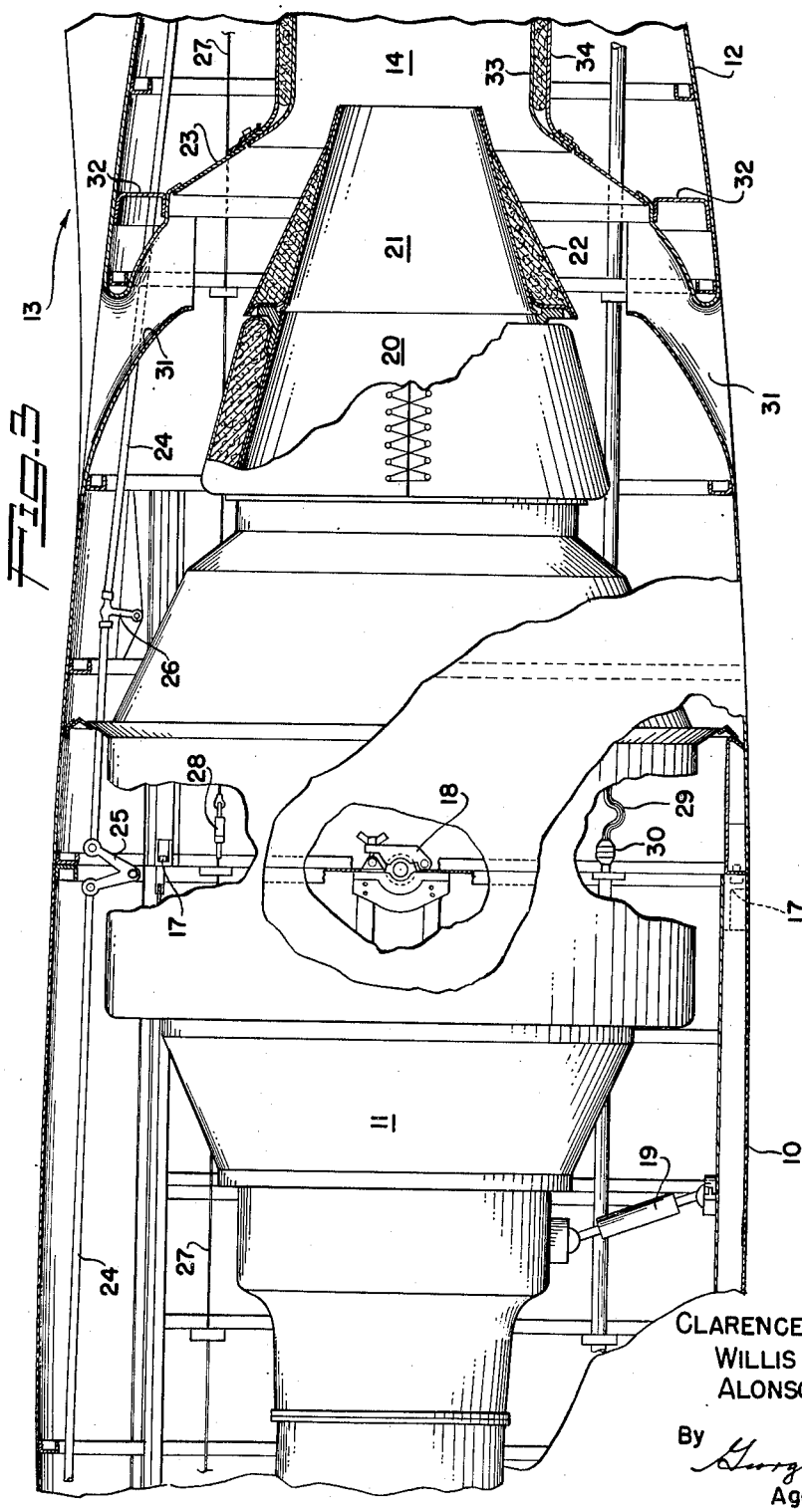
INVENTORS.
CLARENCE L. JOHNSON
WILLIS M. HAWKINS JR.
ALONSO B. STOREY JR.
By George C Sullivan
Agent

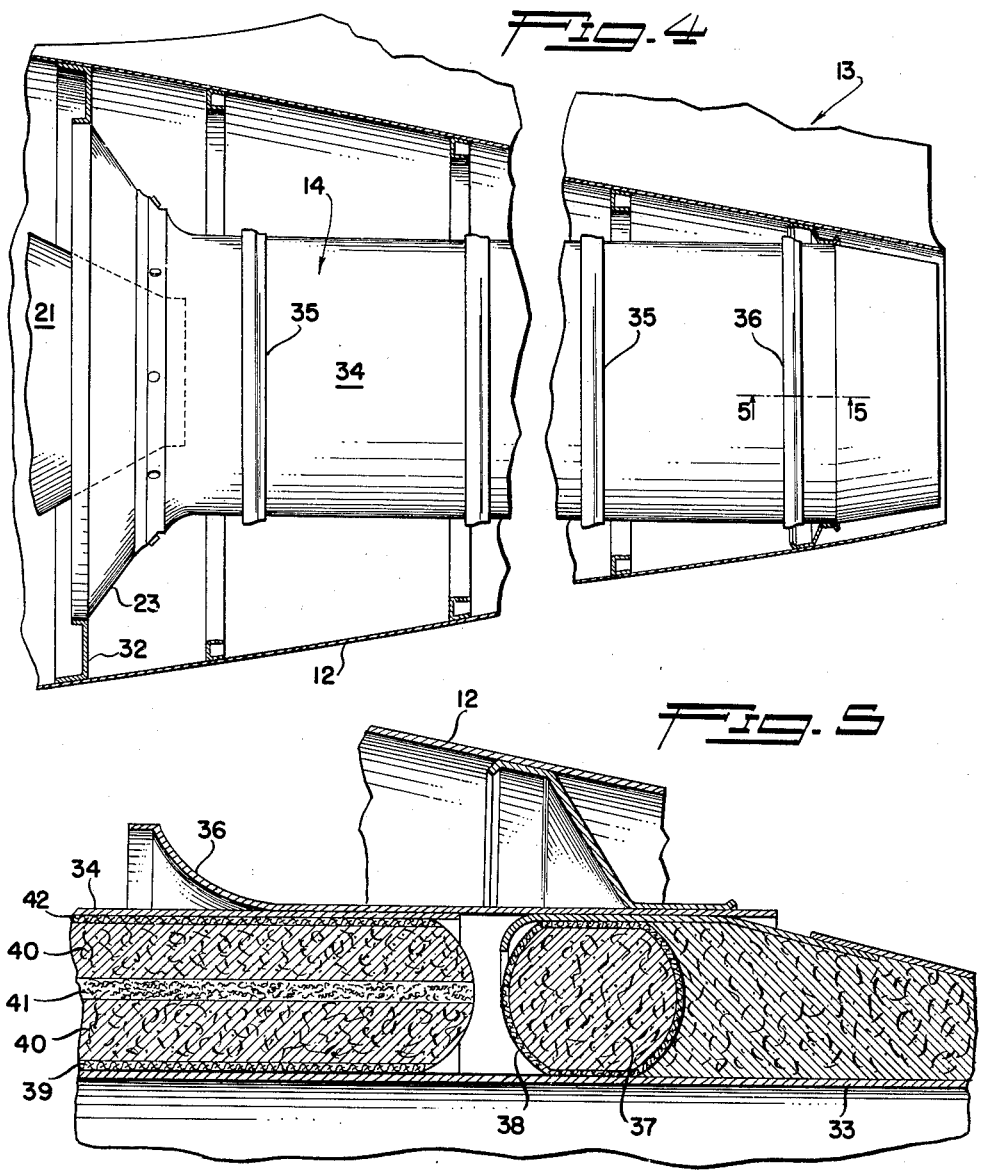

Patented Apr. 18, 1950

2,504,422

UNITED STATES PATENT OFFICE 2,504,422

AIRCRAFT ENGINE AND FUSELAGE ARRANGEMENT

Clarence L. Johnson, Encino, Willis M. Hawkins, Jr., North Hollywood, and Alonzo B. Storey, Jr., Glendale, Calif., assignors to Lockheed Aircraft Corporation, Burbank, Calif.

Original application April 25, 1946, Serial No. 664,904. Divided and this application January 5, 1950, Serial No. 136,934

4 Claims. (Cl. 244—74)

This invention in its broader aspects relates to an engine and fuselage construction arranged to facilitate the removal and replacement of engines buried in the fuselage, this application being a division of our co-pending application Serial No. 664,904, filed April 25, 1946. The invention more specifically relates to the installation of a jet propulsion engine or turbine, together with the jet outlet or tail pipe, and makes provision for thermal expansion and insulation of the latter.

It is accordingly an object of this invention to provide an improved and simplified fuselage construction providing ready access to and removal of an engine mounted within the contour of the fuselage. Such engine locations have been called "buried" in the sense that the engine is not mounted in a power nacelle or on the nose of the fuselage, and in the case of a conventional reciprocating engine it may drive a tractor or pusher propeller through an extension and/or offset drive shaft. In the case of a jet engine or turbine provision is made for a coaxial tail pipe for discharging the products of combustion; the reaction or thrust of such a jet engine or turbine being carried through the engine mounts as in the case of a reciprocating engine.

This application is a division of a parent application entitled Engine and fuselage arrangement, Serial Number 664,904 filed April 25, 1946, wherein the tail pipe construction and insulation is claimed.

Further objects of this invention are to simplify the stress and heat problems encountered in the design and assembly of the tail pipe and to prevent the transmission of stresses due to fuselage deflections, manufacturing tolerances, misalignment and aerodynamic or mechanical loads to the engine or turbine.

Other objects and features of the invention will be readily understood from the following detailed description of a typical preferred form of the invention wherein reference will be made to the accompanying drawings in which:

Figure 1 is a perspective view of an airplane embodying the features of this invention;

Figure 2 is a view similar to Figure 1 showing the tail section or empennage detached from the remainder of the fuselage;

Figure 3 is an enlarged fragmentary section through the region of the joint in the fuselage showing the engine mounts and quick detachable control connections;

Figure 4 is an enlarged view of the engine tail pipe, the front end of which is also shown at the right of Figure 3; and Figure 5 is an enlarged fragmentary section taken on the line 5—5 of Figure 4 showing the arrangement of insulation and provision for expansion in the tail pipe.

As shown on the drawings:

As a specific example, I have chosen to illustrate a jet propelled type of airplane wherein the fuselage 10 is separable at the mounting location of the jet propulsion engine 11, the rear portion 12 of the fuselage being bodily removable, with its associated empennage 13 and a tail or exhaust pipe 14 for the engine 11, exposing the engine for ready access and removal. The two sections of the fuselage carry bulkhead rings 15 and 16 which mate and are fastened together as by a series of bolts 17 to secure alignment of the fuselage sections. The engine is mounted by a pair of oppositely disposed ball type pivotal mounts 18 on the bulkhead ring 15 and the front end of the engine is supported by an adjustable ball ended mount 19, the adjustment of which aligns or centers the discharge cone 20 and nozzle 21 of the engine relative to the tail pipe 14. As the engine was originally designed, the tail pipe 14 was clamped to a collar 22 on the discharge cone 20, but as will appear in more detail elsewhere, we have substituted a nozzle 21 attached to the collar 22 and supporting the front end of the tail pipe in spaced relationship thereto in a conical diaphragm 23 in the rear portion 12 of the fuselage.

The necessary elevator, rudder and trim tab controls are arranged to be quickly disconnectable in the region of the joint between the fuselage sections. As indicated in Figure 3, a push-pull control rod 24 is carried past the joint by rocker levers 25 and a disconnectable link 26 therebetween; while a cable control 27 has a quick disconnect fitting 28 therein. Similarly a plurality of electrical wires 29 are provided with a multiple or gang connector 30 to facilitate separation of the fuselage sections. With such connections and controls released the entire tail section can then be removed by the release of the bolts 17. In actual practice, the tail section has been disconnected, the engine removed and replaced with another, and the tail section replaced, all within fifteen minutes.

The front end of the tail pipe is supported by the conical diaphragm, air being drawn in through intakes 31 in the fuselage skin by the ejector effect of the engine exhaust jet. The air so drawn in is from the boundary layer of air on the fuselage, and serves to both cool and augment the jet effect in the tail pipe. Cooling protection and insulation of such tail pipes is critical, since the maximum gas temperatures may at times exceed 1300° F., and leakage of gas at such temperatures into the tail section would destroy the latter. The cooling effect of the indrawn air is especially effective as it forms a sheath around the central jet of hot gases. The jet has a suction effect of eliminating possible outward leakage of hot gases in the event of battle damage or rupture of the tail pipe, such induced flow also serving to purge the tail pipe in flight after the engine has stopped.

As best shown in Figure 4, the tail pipe 14 is detachably secured at its front end to its diaphragm 23, the rear end being slidably mounted in a bulkhead ring 32 because the tail pipe grows or lengthens over an inch when at operating temperatures. Because of the critical temperature conditions in the tail pipe, it is preferably arranged as shown in the detailed section of Figure 5, wherein inner and outer shells, 33 and 34 of stainless steel, are separated by suitable insulation, to be described in more detail hereinafter. The outer shell 34 carries a series of flanged hoops 35 and 36 to maintain the assembly against flattening or collapse of the hoop 36 serving as a sliding surface under the bulkhead ring 32.

Because of the crtical temperature range in the tail pipe, the problem of insulation thereof without excessive weight penalty has proved particularly difficult to solve. We have found that the use of certain light-weight insulating materials may permit "floating" of the inner shell 34 due to the tendency of the insulation to flow. In one case a floating force of 160 pounds, much more than the weight of the inner shell, tended to distort or bow the latter as the insulation tended to work down underneath the inner shell, leaving the upper portion uncovered. In order to overcome this floating tendency in connection with displaceable insulation, we have provided a plurality of load bearing rings comprising a central core of amosite 37, a South African species of asbestos, having superior heat resistance, either wrapped in a sheet of woven fiber glass 38 and wound with Inconel wire at one-quarter inch pitch, or enclosed in a knitted tube of Inconel wire, the stretching of such a knitted wire tube serving to compact the amosite filling.

Between such bearing rings, the best combination of light-weight and insulation properties is a composite blanket comprising an inner layer of leached woven fiber glass fabric 39, a second felted layer of fiber glass textile scrap 41, and this felted layer of leached fiber glass fabric 40 and an enclosing outer layer of unleached fiber glass fabric 42. Leached fiber glass is a relatively new material wherein acid is used to remove the boron and alkali constituents leaving quartz. Ordinary glass fiber has a softening point of about 1500° F. and becomes brittle at 1300° F. whereas such glass fibers when acid-leached, leave a molecular silica skeleton of greatly reduced strength, but with greatly increased refractoriness to heat, tests having shown that no fusing of fibers occurs at 1900° F.

The central layer of glass fabric scraps is used primarily for bullet sealing purposes, as we have found that bullets penetrating the tail pipe assembly tend to pull such fabric scraps into the hole, substantially plugging the same. This arrangement serves to protect the enveloping airplane structure from heat and corrosive damage due to possible leakage of the hot gas blast in the tail pipe.

Having described only a typical form of the invention we do not wish to be limited to the specific details herein set forth, but wish to reserve to ourselves any variations or modifications that may appear to those skilled in the art or fall within the scope of the following claims.

We claim:

1. In combination with an airplane fuselage and a power plant therefor, a removable tail section forming a continuation of said fuselage, said power plant being located within the fuselage adjacent the junction of said tail section therewith, means for joining said tail section to the balance of said fuselage including at least a portion of a mounting means for said power plant whereby said mounting means will be exposed for ready removal of said power plant upon disconnection and removal of said tail section, a power plant exhaust tail pipe axially disposed in said tail section and separable as a unit therewith, and means for supporting said exhaust tail pipe in said tail section adapted to permit longitudinal thermal expansion thereof.

2. In an airplane wherein a power plant has mounts attached to the airplane fuselage, means providing a quickly demountable transverse fuselage joint adjacent the power plant mounts whereby removal of the rear portion of the fuselage facilitates access to and removal of the power plant from the forward portion of the fuselage, a tail pipe adapted to receive the exhaust from the power plant, said tail pipe being disposed axially through the rear portion of the fuselage and removable as a unit therewith, and mounting means for said tail pipe comprising a diaphragm adjacent the forward end thereof for maintaining the tail pipe in alignment with the power plant, and a sliding support adjacent the rear end thereof adapted to permit longitudinal expansion of said tail pipe.

3. In combination with an airplane fuselage having a body section and a removable tail section, a power plant located within the fuselage adjacent the junction of said body and tail sections, cooperating bulkhead rings carried by said body and tail sections, means for detachably connecting said bulkhead rings to detachably connect said fuselage sections, means including said bulkhead rings for mounting said power plant, whereby said mounting means will be exposed for ready removal of said power plant upon disconnection and removal of said tail section, and a power plant exhaust tail pipe axially disposed in said tail section and separable as a unit therewith.

4. In combination with an airplane fuselage having a body section and a removable tail section, a power plant located within the fuselage adjacent the junction of said body and tail sections, cooperating bulkhead rings carried by said body and tail sections, means for detachably connecting said bulkhead rings to detachably connect said fuselage sections, means including said bulkhead rings for mounting said power plant, whereby said mounting means will be exposed for ready removal of said power plant upon disconnection and removal of said tail section, a power plant exhaust tail pipe axially disposed in said tail section and separable as a unit therewith, and means for mounting said tail pipe in said tail section to provide for longitudinal thermal expansion thereof.

CLARENCE L. JOHNSON.
WILLIS M. HAWKINS, Jr.
ALONZO B. STOREY, Jr.

No references cited.